Patented Dec. 2, 1952

2,620,324

UNITED STATES PATENT OFFICE 2,620,324

POLYMERIZATION OF ACRYLONITRILE IN THE PRESENCE OF AMIDE POLYMERS

Harry W. Coover, Jr., and Joseph B. Dickey, Kingsport, Tenn., assignors to Eastman Kodak Company, Rochester, N. Y., a corporation of New Jersey No Drawing. Application December 1, 1950, Serial No. 198,761

19 Claims. (Cl. 260—45.5)

This invention relates to the polymerization of acrylonitrile in the presence of amide polymers, and to articles obtained therefrom.

It has been previously proposed to polymerize acrylonitrile in the presence of polyvinyl resins, such as polyvinyl acetate (U. S. Patent 2,123,599, dated July 12, 1938). The polymers obtained according to the suggested method in U. S. Patent 2,123,599 can be used to prepare synthetic fibers, which are susceptible to many of the known organic dyes. A serious drawback with this method is that the fibers thus obtained have too low a softening temperature to be of commercial value, softening being observed at temperatures as low as 145° C.

Attempts have been made to increase the dyeability of polyacrylonitrile fibers by interpolymerizing acrylonitrile with certain monomers whose polymers have an affinity for dyes. While this procedure does give polymer products, from which fibers having good dyeing properties can be obtained, a serious drawback, such as that mentioned above, arises in certain instances, a substantial lowering of the softening point of the fiber being observed. For example, while an interpolymer of acrylonitrile and vinyl acetate containing about 80 percent by weight of acrylonitrile can be drawn into fibers susceptible to dyeing, the softening point of such fibers is too low for practical purposes, softening of the fibers being observed at about 150°–170° C.

Other attempts have been made to increase the dyeability of polyacrylonitrile fibers by mixing with the polyacrylonitrile, before spinning, other polymeric materials which are dyesusceptible. This procedure likewise provides fibers having good dyeing properties; however, many of these fibers show a low softening point, and in addition many show segmentation into their individual components along their horizontal axis. For example, it can be demonstrated that mixtures of polyvinyl acetate and polyacrylonitrile, when dissolved in either N,N-dimethylformamide or N,N-dimethylacetamide in proportions varying from 15 to 50 percent by weight of polyvinyl acetate based on the total weight of the mixed polyacrylonitrile and polyvinyl acetate, form grainy dopes which separate into two liquid layers on standing. This is also true of many other polymeric compounds, natural or synthetic, which are soluble in the above solvents. Fibers which form from these non-homogenous solutions or mixtures of polyacrylonitrile and polyvinyl acetate are too low in softening temperature to be of practical value, and also are subject to the defect of segmentation. This is not surprising, because of the non-homogenous condition of the spinning solution and the fact that it is generally known that polyacrylonitrile is not compatible with many organic substances.

We have now made the unusual and valuable discovery that stable solutions of acrylonitrile polymers, which do not separate into distinct layers on standing, and from which fibers of good dyeability can be spun, can be prepared by polymerizing acrylonitrile in the presence of certain amide polymers. These fibers are characterized by a softening point higher than that of the interpolymers referred to above, and do not exhibit the segmentation defect shown by many of the fibers prepared from certain prior art mixtures comprising polyacrylonitrile. Fibers prepared according to our invention also have a softening point higher than fibers prepared from simple interpolymers of acrylonitrile and alkenyl carbonamides obtained according to the method of Jacobson et al., U. S. Patent 2,311,548, dated February 16, 1943, for example.

It is, therefore, an object of our invention to provide acrylonitrile polymer compositions. A further object of our invention is to provide methods for making these modified polymer compositions. Still another object is to provide homogenous solutions obtained from these polymer compositions comprising acrylonitrile. Another object is to provide fibers from these homogenous solutions, and methods for making these fibers. Other objects will become apparent from a consideration of the following description and examples.

According to our invention, we provide polymer compositions by polymerizing acrylonitrile monomer in the presence of certain alkenyl carbonamide homopolymers or interpolymers. The amounts of acrylonitrile and polymer of alkenyl carbonamide employed in the polymerization have a marked effect on the behavior, or properties, of the polymerization product produced, we have found. The amount of polymer of alkenyl carbonamide used should not be less than 10 percent by weight, based on the combined weights of acrylonitrile and polymer of the alkenyl carbonamide, since amounts smaller than 10 percent by weight of polymer of the alkenyl carbonamide fail to provide polymerization products with acrylonitrile which have dye susceptibility sufficient for the manufacture of a useful product. On the other hand, amounts of the polymer of alkenyl carbonamide in excess of 40 percent by weight, based on the combined weights of the acrylonitrile and the polymer of the alkenyl carbonamide, fail to provide polymerization products with acrylonitrile which give rise to fibers having a softening temperature sufficiently high for ordinary purposes. Therefore, for the purposes of our invention, the polymerization mixture should comprise from 10 to 40 percent by weight of a polymer of an alkenyl carbonamide and from 60 to 90 percent by weight of acrylonitrile monomer.

It is known that acrylonitrile can be polymerized in the presence of certain polymeric emulsifying agents, such as polyacrylamides. Jacobson U. S. Patent 2,354,210, dated July 25, 1944. The amounts of dispersing agents employed in such polymerizations are small, and generally do not exceed 1 or 2 percent by weight, based on the materials being polymerized. Such small amounts of polyamides have little or no beneficial effect, insofar as increasing the dyeability of fibers obtained from the resulting polymer products is concerned.

We have found that homopolymers of alkenyl carbonamides are especially useful in practicing our invention, although interpolymers of alkenyl carbonamides can also be used to advantage. In using interpolymers, care should be taken to select interpolymers containing an amount of alkenyl carbonamide such that the polymerization product with acrylonitrile contains not less than 10 percent by weight of alkenyl carbonamide in the molecule of the polymerization product. Advantageously, we have found that interpolymers containing from 25 to 95 percent by weight of the alkenyl carbonamide and from 75 to 5 percent by weight of a monoethylenically unsaturated, polymerizable, organic compound containing a

I.  $-CH=C<$ group, or more especially, a

II.  $CH_2=C<$ group, can be used, provided that sufficient alkenyl carbonamide is present to provide a polymerization product with acrylonitrile containing at least 10 percent by weight of alkenyl carbonamide in the polymerization product. Thus, when using interpolymers as defined above, the polymerization mixture prior to polymerization will contain:

Acrylonitrile=60 to 88 percent; Interpolymer=12 to 40 percent:
    Alkenyl Carbonamide=10 to .95 (100–AN) percent
    Other component=2 to .75 (100–AN) percent wherein AN equals percentage of acrylonitrile monomer and "other component" represents the monoethylenically unsaturated, polymerizable organic compound as defined above.

Alkenyl carbonamides whose polymers can advantageously be employed in practicing our invention comprise the acrylamides, citraconamides, itaconamides, maleamides, etc. (e. g. amides of alkenyl carboxylic acids containing from 3 to 5 carbon atoms in the acid radical). The acrylamides provide polymers which are especially useful in practicing our invention.

The acrylamides whose polymers can be advantageously used in our invention comprise those represented by the following general formula:

III. 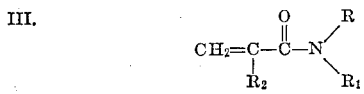

wherein R and R$_1$ each represents a hydrogen atom or alkyl group, such as methyl, ethyl, n-propyl, isopropyl, n-butyl, isobutyl, etc. groups (e. g. an alkyl group of the formula $C_nH_{2n+1}$ wherein $n$ represents a positive integer of from 1 to 4), and R$_2$ represents a hydrogen atom or a methyl group. Typical acrylamides include acrylamide, N-methylacrylamide, N-ethylacrylamide, N-isopropylacrylamide, N-n-butylacrylamide, methacrylamide, N-methylmethacrylamide, N-ethylmethacrylamide, N-isopropylmethacrylamide, N,N-dimethylacrylamide, N,N-diethylacrylamide, N,N-dimethylmethacrylamide, etc.

The itaconamides whose polymers we can advantageously use comprise those represented by the following general formula:

IV. 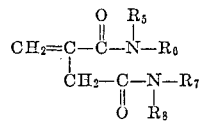

wherein R$_5$, R$_6$, R$_7$, and R$_8$ each represents a hydrogen atom, a methyl group, an ethyl group, etc. Typical itaconamides include itaconamide, N-methyl itaconamide, N-ethyl itaconamide, N,N'-dimethyl itaconamide, N,N'-dimethyl itaconamide, etc.

The citraconamides whose polymers we can advantageously use comprise those represented by the following general formula:

V. 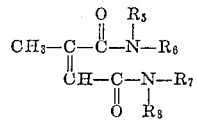

wherein R$_5$, R$_6$, R$_7$, and R$_8$ have the values given above. Typical citraconamides include citraconamide, N-methyl citraconamide, N-ethyl citraconamide, N,N'-dimethyl citraconamide, N,N'-diethyl citraconamide, etc.

Other amides whose polymers are useful in practicing our invention include, for example, α-chloroacrylamide, α-chloro-N-methylacrylamide, methyl α-acetaminoacrylate, ethyl α-acetaminoacrylate, etc.

The monoethylenically unsaturated compounds represented by formulas I and II, whose interpolymers are useful in practicing our invention, comprise the alkenyl carbonamides represented by formulas III, IV, and V above, as well as methyl acrylate, ethyl acrylate, n-propyl acrylate, isopropyl acrylate, n-butyl acrylate, isobutyl acrylate, methyl methacrylate, ethyl methacrylate, n-propyl methacrylate, isopropyl methacrylate, n-butyl methacrylate, isobutyl methacrylate (e. g. alkyl acrylates containing from 1 to 4 carbon atoms in the alkyl group), vinyl acetate, vinyl propionate, styrene, α-methylstyrene, p-acetaminostyrine, α-acetoxystyrene, vinyl chloride, vinylidene chloride, ethyl vinyl ether, isopropyl vinyl ether, isopropenyl methyl ketone, ethyl isopropenyl ketone, methyl vinyl ketone, ethyl vinyl ketone, dimethyl maleate, diethyl maleate, diethyl maleate, diisopropyl maleate, dimethyl fumarate, diethyl fumarate, diisopropyl fumarate, acrylic acid, methacrylic acid, fumaronitrile, acrylonitrile, methacrylonitrile, N-vinylphthalimide, ethylene, butadiene, vinyl fluoride, perfluoroethylene, vinylpyridines, etc.

The polymerization is advantageously carried out in an aqueous medium, although other reaction media, such as organic solvents, can be employed; for example, a polymerization medium consisting of aqueous acetone, or other aqueous solvent can be used.

The polymerization can be accelerated by the use of a well known polymerization catalyst. Such catalysts are commonly used in the art of polymerization, and our invention is not to be limited to any particular catalyst material. Catalysts which have been found to be especially useful comprise the peroxide polymerization catalysts, such as the organic peroxides (e. g. benzoyl peroxide, acetyl peroxide, acetyl benzoyl peroxide, lauryl peroxide, oleoyl peroxide, triacetone peroxide, urea peroxide, t-butyl hydroperoxide, alkyl percarbonates, etc.), hydrogen peroxide, perborates (e. g. alkali metal perborates, such as those of sodium and potassium, etc.), persulfates (e. g. alkali metal ammonium persulfate, etc.). Other catalysts such as the ketazines, azines, etc. can be used. The quantity of catalyst used can be varied, depending on the monomer, amount of diluent, etc.

The temperatures at which the process of our invention can be carried out vary from ordinary room temperature to the reflux temperature of the reaction mixture. Generally a temperature of from 25° to 75° C. is sufficient.

If desired, emulsifying agents can be added to the reaction mixture to distribute uniformly the reactants throughout the reaction medium. Typical emulsifying agents include the alkali metal salts of certain alkyl acid sulfates (e. g. sodium lauryl sulfate), alkali metal salts of aromatic sulfonic acids (sodium isobutylnaphthalenesulfonate), alkali metal or amine addition salts of sulfosuccinic acid esters, alkali metal salts of fatty acids containing from 12 to 20 carbon atoms, sulfonated fatty acid amides, alkali metal salts of alkane sulfonic acids, sulfonated ethers, etc.

The polymerization can be carried out in the presence of chain regulators, such as hexyl, octyl, lauryl, dodecyl, myristyl mercaptans, etc., which impart improved solubility properties to the polymer compositions. If desired, reducing agents such as alkali metal bisulfites (e. g. potassium, sodium, etc. bisulfites) can be added to reduce the time required for the polymerization to be effected.

The polymer of the alkenyl carbonamide can advantageously be suspended in an aqueous medium containing the polymerization catalyst, and the suspension (or solution) heated for a time (e. g. 30 minutes to 24 hours) prior to the addition of the acrylonitrile, and the mixture then subjected to polymerizing conditions. Alternatively, the polymer of the alkenyl carbonamide can be added to an aqueous mixture (solution or emulsion) containing the acrylonitrile and polymerization catalyst, and the mixture then subjected to polymerizing conditions. The acrylonitrile monomer and the polymer of the alkenyl carbonamide can be mixed together, and the mixture added to an aqueous medium containing a polymerization catalyst.

The following examples will serve to illustrate further the manner whereby we practice our invention.

*Example 1*

2.0 g. of poly-N-methylacrylamide were dissolved in 100 cc. of water containing 0.1 g. of ammonium persulfate, 0.1 g. of potassium bisulfite, and 8.0 g. of acrylonitrile. The resulting solution was allowed to polymerize for 16 hours at 25° C., and the resulting polymer was filtered off. After drying there was obtained a product weighing 8.7 g. It was found to contain 19 percent by weight of N-methylacrylamide on analysis.

Fibers obtained by preparing a solution of the polymer obtained above in N,N-dimethylformamide, and extruding the solution into a precipitating bath, had the tenacity of 3.0 g. per denier, and extensibility of 16 percent, a sticking temperature of 190° C., and shrank only 12 percent in boiling water.

Fibers obtained in an identical manner from an interpolymer of N-methylacrylamide and acrylonitrile containing 19 percent by weight of the N-methylacrylamide had a tenacity of 2.3 g. per denier, an extensibility of 13 percent, a sticking temperature of 130° C., and shrank 26 percent in length when held for 30 seconds in a relaxed state in boiling water. The fibers stiffened and stuck together when dyed by standard methods.

*Example 2*

3.0 g. of an interpolymer of acrylonitrile and N-methylmethacrylamide containing 76 percent by weight of N-methylmethacrylamide were dissolved in 100 cc. of water, along with 0.1 g. of ammonium persulfate and 0.1 g. of potassium bisulfite. The resulting solution was tumbled end-over-end for 18 hours at 25° C., and 7.0 g. of acrylonitrile were then added, and the polymerization allowed to continue for 48 hours at 25° C. The resulting polymeric material was precipitated by the addition of acetone, and then collected by centrifuging. After drying, there were obtained 9.2 g. of polymeric material containing 19 percent by weight of N-methylmethacrylamide.

Fibers were then spun by extruding a solution of the polymer in N,N-dimethylformamide into a precipitating bath. The fibers thus obtained had a tenacity of 3.2 g. per denier, an extensibility of 20 percent, a sticking temperature of 195° C., and shrank only 10 percent in boiling water. These fibers showed an excellent affinity for acetate, direct, vat, and acid dyes, and they did not stiffen or stick together in the dye bath.

Fibers obtained in a like manner by extruding a solution of an interpolymer of N-methylmethacrylamide and acrylonitrile containing 19 percent by weight of the N-methylmethacrylamide into a precipitating bath had a tenacity of 2.5 g. per denier, an extensibility of 17 percent, a sticking temperature of 140° C., and shrank 25 percent in length when held for 30 seconds in a relaxed state in boiling water. These fibers stiffened and stuck together when dyed by standard methods.

*Example 3*

1.0 g. of poly-N-isopropylacrylamide was added to 60 cc. of water containing 1 cc. of 7-ethyl-2-methylundecan-4-sulfonic acid sodium salt (Tergitol No. 4). The mixture was then tumbled end-over-end for 1 hour at 50° C. The solution was cooled and 8.5 g. of acrylonitrile, 0.1 g. of ammonium persulfate, and 0.1 g. of sodium bisulfite were added. The polymerization was effected by tumbling for 16 hours at 25° C. The polymer was obtained in an 85 percent yield and contained 10 percent by weight of N-isopropylacrylamide.

Fibers spun by extruding a solution of this polymer in N,N-dimethylacetamide into a precipitating bath had a tenacity of 3.9 g. per denier, an extensibility of 17 percent, a sticking temperature of 195° C., and shrank only 8 percent in boiling water.

Example 4

3.0 g. of an interpolymer of N,N-dimethylacrylamide and vinyl acetate containing 60 percent by weight of N,N-dimethylacrylamide were dissolved in 50 cc. of a 50 percent solution of acetonitrile in water. There were then added 6.0 g. of acrylonitrile, 0.1 g. of ammonium persulfate, and 0.1 g. of sodium bisulfite. The polymerization was effected by heating for 16 hours at 40° C. The precipitated polymer was obtained in a 72 percent yield and contained 29 percent by weight of the amidevinylacetate interpolymer upon analysis.

Fibers spun by extruding a solution of the polymer in N,N-dimethylformamide into a precipitating bath had a tenacity of 3.3 g. per denier, an extensibility of 18 percent, a sticking temperature of 180° C. and shrank 12 percent in boiling water. The fibers showed an excellent affinity for acetate, direct, vat, and acid dyes.

Example 5

2.0 g. of an interpolymer of N-methylacrylamide and acrylamide containing 30 percent by weight of N-methylacrylamide were added to 70 cc. of water containing 0.1 g. of sodium bisulfite and 9.0 g. of acrylonitrile. The resulting solution was then polymerized for 16 hours at 35° C. The polymer was filtered off and then dried. It was obtained in an 80 percent yield and was found to contain 17 percent by weight of the N-methylacrylamide-acrylamide interpolymer on analysis.

Fibers spun by extruding a solution of this polymer in N,N-dimethylformamide into a precipitating bath had a softening point of 200° C., and showed excellent dye affinity.

Example 6

4.0 g. of poly-N,N-dimethylmethacrylamide were dissolved in 75 cc. of acetonitrile containing 6.5 g. of acrylonitrile and 0.3 g. of benzoyl peroxide. The resulting solution was then heated for 24 hours at 50° C., and then cooled. The precipitated polymer was collected on a filter, washed, and dried. It was found to contain 39 percent by weight of N-dimethylmethacrylamide on analysis.

Fibers obtained from this polymer had a sticking temperature of 180° C., and showed excellent dye affinity.

Example 7

3.0 g. of an interpolymer of citraconic diamide and methyl methacrylate containing 28 per cent by weight of the diamide were emulsified in 100 cc. of water containing 3 cc. of a sulfonated ether (Triton 720). There were then added 7.0 g. of acrylonitrile, 0.15 g. of potassium persulfate, and 0.1 g. of sodium bisulfite. The resulting emulsion was heated for 16 hours at 35° C., and then cooled to room temperature. The precipitated polymer was collected on a filter, washed and dried. It contained 28 percent by weight of the citraconic diamide-methyl methacrylate interpolymer on analysis.

Fibers obtained from this polymer product had a sticking temperature of 185° C.

Example 8

2.0 g. of poly-N,N'-dimethylitaconic diamide were emulsified in 80 cc. of water containing 3 cc. of 7-methyl-2-methyundecan-4-sulfonic acid sodium salt (Tergitol No. 4). There were then added 8.0 g. of acrylonitrile, 0.1 g. of potassium persulfate, and 0.1 g. of sodium bisulfite, and the emulsion was heated at 35° C., for 16 hours with tumbling. The emulsion was then cooled to room temperature, the precipitated polymer filtered off, washed with distilled water, and dried. It was found to contain 21 percent by weight of N,N-dimethylitaconic diamide, and it was obtained in an 89 percent yield.

Fibers spun by extruding a solution of this polymer in N,N-dimethylacetamide into a precipitating bath had a tenacity of 3.8 g. per denier, an extensibility of 16 percent, and shrank only 9 percent in boiling water. They had a sticking temperature of 195° C., and showed an excellent affinity for dyes.

Example 9

3.0 g. of an interpolymer of acrylamide and methyl acrylate containing 80 percent by weight of acrylamide were dissolved in 100 cc. of water containing 0.1 g. of potassium persulfate, 0.1 g. of sodium bisulfite, and 7.0 g. of acrylonitrile. The resulting solution was then heated for 16 hours at 35° C. The solution was cooled to room temperature, and the precipitated polymer filtered off, washed with distilled water, and finally dried. It was obtained in an 88 percent yield and was found to contain 28 percent by weight of the acrylamide-methyl acrylate interpolymer on analysis.

Fibers obtained from this polymer had a sticking temperature of 190° C.

Example 10

3.0 g. of poly-N-methylmethacrylamide were dissolved in 100 cc. of water to which 0.1 g. of ammonium persulfate, 0.1 g. of sodium bisulfite, and 7.0 g. of acrylonitrile were added. The resulting solution was heated for 16 hours at 30° C., then cooled to room temperature. The precipitated polymer was filtered off, washed with distilled water, and then dried. It was found to contain 29 percent by weight of N-methylmethacrylamide on analysis.

Fibers were then spun from this product by extruding a solution thereof in N,N-dimethylformamide into a precipitating bath. The fibers thus obtained had a tenacity of 3.8 g. per denier, an extensibility of 18 percent, a sticking temperature of 200° C., and shrank only 8 percent in boiling water.

The alkenyl carbonamide polymers employed in the above examples can be prepared as described in U. S. Patent 2,311,548 mentioned above, or according to the method described in our copending application Serial No. 198,762, filed on even date herewith.

Other solvents which can be used for the preparation of fibers from the new polymers of our invention include ethylene carbonate, ethylene carbamate, γ-butyrolactone, N-methyl-2-pyrrolidone, N,N-dimethylmethoxyacetamide, dimethylcyanamide, N,N-dimethylcyanoacetamide, N,N-dimethyl-β-cyanopropionamide, glycolonitrile (formaldehyde cyanohydrin), malononitrile, ethylenecyanohydrin, dimethylsulfoxide, dimethyl sulfone, tetramethylene sulfone, tetramethylene sulfoxide, N-formylpyrrolidine, N-formylmorpholine, N,N'-tetramethylmethanephosphonamide, etc. Generally speaking, we have found that N,N-dimethylformamide and N,N-dimethylacetamide are particularly advantageous. The amount of polymer dissolved in the solvent can vary from about 10 to 40 percent by weight.

The term dispersion as used herein is intended to include both true solutions and emulsions.

The method described in this application is to be distinguished from the methods described in our copending applications Serial No. 164,854, filed on May 27, 1950, and Serial No. 198,762, filed on even date herewith, wherein acrylonitrile is added to a polymer which has not been separated from its polymerization medium, and the acrylonitrile then polymerized. Our present invention contemplates the use of polymers which have been separated from their polymerization medium prior to use, which method is not generally as advantageous as the methods of the above-mentioned applications, although the advantages over methods heretofore used are quite marked.

What we claim as our invention and desire secured by Letters Patent of the United States is:

1. A process for preparing resinous compositions comprising heating in the presence of a polymerization catalyst a dispersion of from 60 to 90 percent by weight of acrylonitrile and from 10 to 40 percent by weight of an isolated polymer of an amide of an alkenyl carboxylic acid containing from 3 to 5 carbon atoms in the acid radical.

2. A process for preparing resinous compositions comprising heating in the presence of a polymerization catalyst an aqueous dispersion of from 60 to 90 percent by weight of acrylonitrile and from 10 to 40 percent by weight of an isolated homopolymer of an amide selected from those represented by the following general formula:

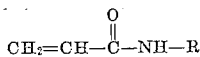

wherein R represents an alkyl group containing from 1 to 4 carbon atoms, until the acrylonitrile has substantially completely polymerized.

3. A process for preparing resinous compositions comprising heating in the presence of a polymerization catalyst an aqueous dispersion of from 60 to 90 percent by weight of acrylonitrile and from 10 to 40 percent by weight of an isolated homopolymer of an amide selected from those represented by the following general formula:

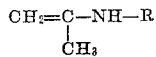

wherein R represents an alkyl group containing from 1 to 4 carbon atoms, until the acrylonitrile has substantially completely polymerized.

4. A process for preparing resinous compositions comprising heating in the presence of a polymerization catalyst an aqueous dispersion of from 60 to 90 percent by weight of acrylonitrile and from 10 to 40 percent by weight of an isolated homopolymer of an amide selected from those represented by the following general formula:

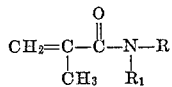

wherein R and $R_1$ each represents an alkyl group containing from 1 to 4 carbon atoms, until the acrylonitrile has substantially completely polymerized.

5. A process for preparing resinous compositions comprising heating in the presence of a polymerization catalyst an aqueous dispersion of from 60 to 90 percent by weight of acrylonitrile and from 10 to 40 percent by weight of an isolated homopolymer of an amide selected from those represented by the following general formula:

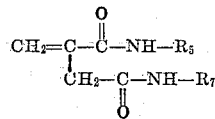

wherein $R_5$ and $R_7$ each represents an alkyl group containing from 1 to 4 carbon atoms, until the acrylonitrile has substantially completely polymerized.

6. A process for preparing resinous compositions comprising heating in the presence of a polymerization catalyst a dispersion of from 60 to 88 percent by weight of acrylonitrile and from 12 to 40 percent by weight of an isolated interpolymer, the percentages by weight being based on the combined weights of the acrylonitrile and the interpolymer, said interpolymer containing from 25 to 95 percent by weight of an amide of an alkenyl carboxylic acid containing from 3 to 5 carbon atoms in the acid radical and from 75 to 5 percent by weight of a monoethylenically unsaturated, polymerizable, organic compound containing a

group, provided always that the amount of the alkenyl carbonamide in the said interpolymer is is such that the polymerization product with acrylonitrile contains from 10 to 38 percent by weight of the alkenyl carbonamide in the molecule of the polymerization product with acrylonitrile, and continuing the heating until the added acrylonitrile has substantially completely polymerized.

7. A process for preparing resinous compositions comprising heating in the presence of a polymerization catalyst a dispersion of from 60 to 88 percent by weight of acrylonitrile and from 12 to 40 percent by weight of an isolated interpolymer, the percentages by weight being based on the combined weights of the acrylonitrile and the interpolymer, said interpolymer containing from 25 to 95 percent by weight of an amide of an alkenyl carboxylic acid containing from 3 to 5 carbon atoms in the acid radical and from 75 to 5 percent by weight of a monoethylenically unsaturated, polymerizable, organic compound containing a

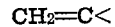

group, provided always that the amount of the alkenyl carbonamide in the said interpolymer is such that the polymerization product with acrylonitrile contains from 10 to 38 percent by weight of the alkenyl carbonamide in the molecule of the polymerization product with acrylonitrile, and continuing the heating until the added acrylonitrile has substantially completely polymerized.

8. A process for preparing resinous compositions comprising heating in the presence of a peroxide polymerization catalyst an aqueous dispersion of from 60 to 90 percent by weight of acrylonitrile and from 10 to 40 percent by weight of isolated poly-N-methylacrylamide until the acrylonitrile has substantially completely polymerized.

9. A process for preparing resinous compositions comprising heating in the presence of a peroxide polymerization catalyst an aqueous dispersion of from 60 to 90 percent by weight of acrylonitrile and from 10 to 40 percent by weight of isolated poly - N,N - dimethylmethacrylamide until the acrylonitrile has substantially completely polymerized.

10. A process for preparing resinous compositions comprising heating in the presence of a peroxide polymerization catalyst an aqueous dispersion of from 60 to 90 percent by weight of acrylonitrile and from 10 to 40 percent by weight of isolated poly-N,N'-dimethylitaconic diamide until the acrylonitrile has substantially completely polymerized.

11. A process for preparing resinous compositions comprising heating in the presence of a peroxide polymerization catalyst an aqueous dispersion of from 60 to 88 percent by weight of acrylonitrile and from 12 to 40 percent by weight of an isolated interpolymer, the percentages by weight being based on the combined weights of acrylonitrile and the interpolymer, said interpolymer containing from 25 to 95 percent by weight of an amide of an alkenyl carboxylic acid containing from 3 to 5 carbon atoms in the acid radical, and from 75 to 5 per unit by weight of an alkyl methacrylate containing from 1 to 4 carbon atoms in the alkyl group, provided always that the amount of the alkenyl carbonamide in the said interpolymer is such that the polymerization product with acrylonitrile contains from 10 to 38 percent by weight of the alkenyl carbonamide in the molecule of the polymerization product with acrylonitrile, and continuing the heating until the added acrylonitrile has substantially completely polymerized.

12. A process for preparing resinous compositions comprising heating in the presence of a peroxide polymerization catalyst an aqueous dispersion of from 60 to 90 percent by weight of acrylonitrile and from 10 to 40 percent by weight of isolated poly-N-methylmethacrylamide until the acrylonitrile has substantially completely polymerized.

13. The products obtained according to the process of claim 1.

14. The products obtained according to the process of claim 6.

15. The products obtained according to the process of claim 11.

16. The products obtained according to the process of claim 2.

17. The products obtained according to the process of claim 3.

18. The products obtained according to the process of claim 4.

19. The products obtained according to the process of claim 5.

HARRY W. COOVER, JR.
JOSEPH B. DICKEY.

REFERENCES CITED

The following references are of record in the file of this patent:

UNITED STATES PATENTS

| Number | Name | Date |
| --- | --- | --- |
| 2,067,234 | Gordon et al. | Jan. 12, 1937 |
| 2,133,257 | Strain | Oct. 11, 1938 |
| 2,311,548 | Jacobson et al. | Feb. 16, 1943 |
| 2,425,192 | Kropa | Aug. 5, 1947 |